Patented Mar. 6, 1951

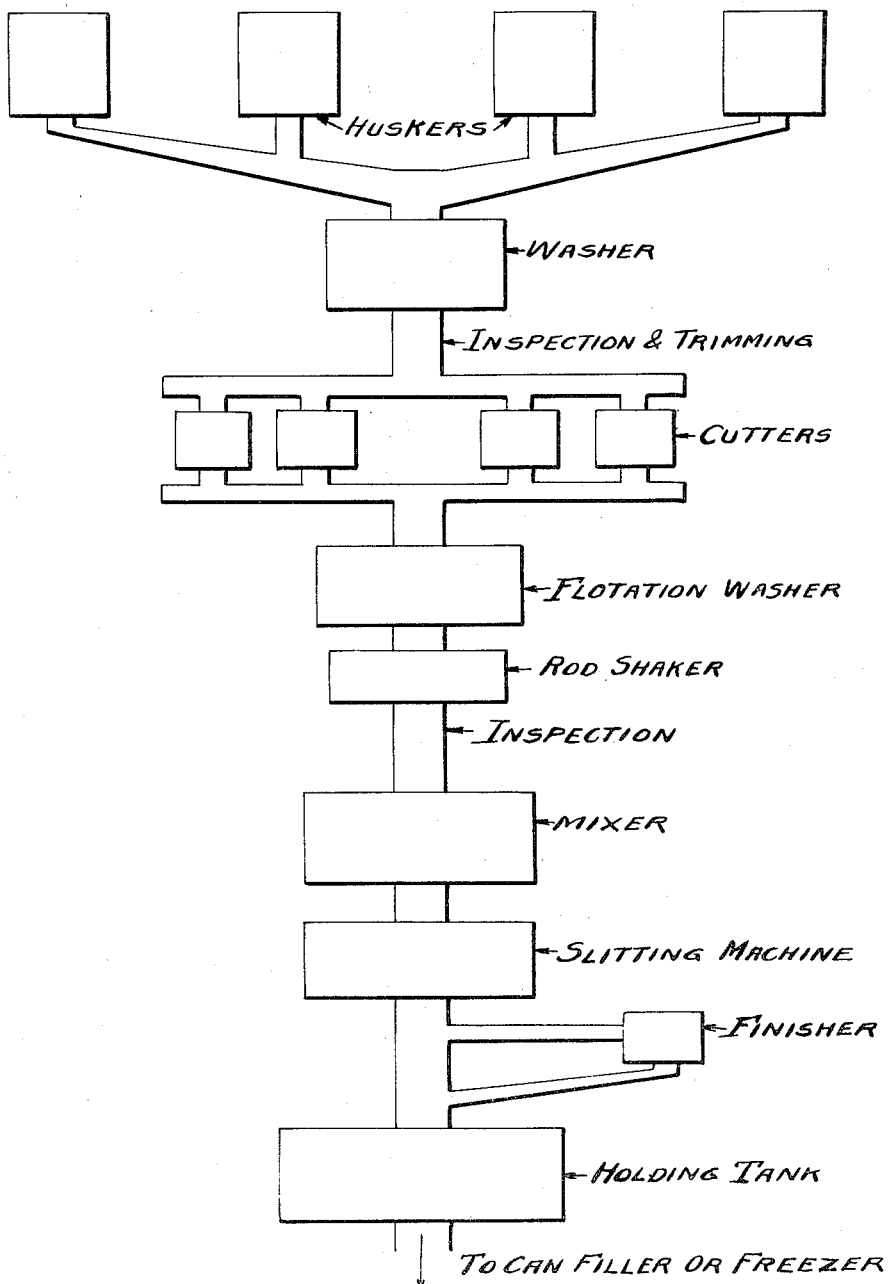

2,544,380

UNITED STATES PATENT OFFICE 2,544,380

METHOD OF PREPARING CORN

William J. Fitzpatrick, Western Springs, Ill., assignor to The W. J. Fitzpatrick Company, Chicago, Ill., a corporation of Illinois Application June 16, 1950, Serial No. 168,633

5 Claims. (Cl. 99—186)

This invention relates to an improved method of preparing corn and particularly to the preparation of cream style corn for canning or freezing.

In the preparation of cream style corn by conventional methods, it is impossible completely to clean the corn. As a result there is a certain amount of silks, cob pieces, and the like in the product. Also when the corn is infested with worms such as corn borer, such worms find their way into the product.

On the other hand, whole kernel corn can be very effectively cleaned by washing, shaking and hand picking the kernels after they have been cut from the cob. By these methods all silks, cob pieces and other foreign matter can be removed and any kernels which are infested with worms or are otherwise undesirable can be removed.

It is one of the objects of the present invention to provide a method in which the corn can be cleaned in the same manner as for whole kernel corn in the preparation of cream style corn.

Another object is to provide a method in which the corn is treated in the same manner as for whole kernel corn and is thereafter slitted to provide a mass containing liquid and pieces of kernels, preferably of different sizes, similar to cream style corn. According to one feature, the whole kernels are mixed with a liquid such as the usual brine added to corn in canning, and the mixture is heated to set the starch components in the kernels before the slitting.

A further object is to provide a method in which a portion of the mixture after slitting is screened to remove loose hulls and the like therefrom.

The above and other objects and advantages of the invention will be more readily apparent when read in connection with the accompanying drawing, in which the single figure is a flow chart illustrating the various steps of a method embodying the invention.

In carrying out the method, as illustrated in the drawing, ears of corn of suitable maturity and type are first husked in the huskers. Thereafter the ears are washed in the usual manner in the washer and are passed over the usual inspection and trimming belt where the ears are visually inspected and are trimmed. The inspected and trimmed ears go to the cutters which cut the whole kernels therefrom in the same manner as for whole kernel corn. It is important that whole kernels be cut since parts of kernels cannot be washed and cleaned without disintegrating. It will be understood that the small hard tips of the kernels are left on the cob in the cutting and that what are referred to herein as whole kernels are kernels as cut for conventional whole kernel corn.

After cutting, the kernels are thoroughly cleaned in the same manner as in conventional whole kernel canning. As shown on the drawing, the kernels pass through a flotation washer and a rod shaker. These operations remove all silks, cob pieces and other foreign material including worms from the kernels. From the rod shaker the kernels pass over an inspection belt where the kernels are visually inspected, and any defective or infested kernels are thrown out.

The thoroughly cleaned kernels then go into a mixer where the usual brine is added, and the mixture is heated. The brine, as usual, consists of water with salt and sugar added and may contain some starch. The mixture is heated to a temperature of about 180° to 190° Fahrenheit which is sufficient to set the starchy constituents in the kernels and to stop the enzymatic action.

At this stage the corn is in the same condition in which it is usually canned or frozen as whole kernel corn, except that it may contain slightly more brine than is usually used in whole kernel corn and the brine may be of a slightly different type. Otherwise, the process as so far described is identical with the conventional process for preparing whole kernel corn.

According to the present invention, the heated mixture is passed through a slitting machine which is preferably of the type more particularly described and claimed in my copending application Serial No. 40,896, filed July 27, 1948. This machine comprises a series of rotating knives which are preferably set different distances apart to cut the kernels into pieces of different sizes. In the cutting operation some of the kernels, particularly those which are cut quite fine, may disintegrate to form with the brine a creamy material corresponding to the creamy constituent of conventional cream style corn. Thus the product at this state contains parts of kernels in cream and corresponds very closely in taste and appearance to conventional cream style corn except that the product of the present invention has been thoroughly cleaned in a manner not possible with cream style corn or any corn product prepared by cutting parts of kernels from the cob instead of whole kernels.

The slitting operation is greatly facilitated by slitting the kernels after being mixed with the brine and further by heating the mixture before slitting. The brine acts in the manner of a lubricant to facilitate passage of the kernels through the slitting knives and to assist in keeping the knives clear during operation. Heating of the mixture as described sets the starchy constituents in the kernels so that they will cut more cleanly and will not tend to crush to the same extent as raw kernels. Also, heating of the kernels partially to cook them prior to slitting minimizes exposure of the raw kernel material to the air and has been found to produce a substantial improvement in the flavor of the product.

From the slitting machine, the product passes to a holding or blending tank where the material is held at a temperature of about 180° F. and is mildly agitated until it goes to the can filling machine or the package filling machine for freezing. The holding or blending tank, as described, is conventional in both whole kernel and cream style corn.

With certain types of corn, and especially with corn of relatively advanced maturity, there may be an excessive amount of loose hulls in the product coming from the slitting machine. According to one feature of the present invention excessive hulls may be removed when they occur in the product by passing a portion of the product through a screen. As shown on the diagram, a portion of the product from the slitting machine may be diverted to pass through a conventional finishing machine, and the screened material from the finishing machine may be returned to mix with the remainder of the product and enter the holding tank. The finishing machine includes a screen and agitators or paddles to move the material over the screen so that liquid and small particles will pass through it, while hulls will be retained and separated from the rest.

The quantity of material diverted to pass through the finishing machine will depend on the character of the corn and its maturity. It has been found, however, that even with mature corn a highly desirable product can be obtained by diverting not to exceed fifteen per cent of the product from the slitting machine. With softer or less mature corn it may not be necessary to divert any through the finishing machine and with different types of corn of differing maturity amounts varying between zero and fifteen per cent may be diverted.

By the present invention, it is possible to produce an extremely clean cream style corn from substantially any type of corn suitable for canning or freezing. The product has physical characteristics very similar to those of conventional cream style corn and has greatly improved flavor.

While the invention has been described in connection with one particular process, it will be understood that variations might be made therein without departing from the spirit and scope of the invention. It is, therefore, not intended that the invention be limited to the exact process described nor otherwise than by the terms of the appended claims.

What is claimed is:

1. The method of preparing corn comprising cutting substantially whole corn kernels from the cob, cleaning the kernels, adding liquid to the kernels, and slitting at least a portion of the kernels in the liquid.

2. The method of preparing corn comprising cutting substantially whole corn kernels from the cob, cleaning the kernels, adding liquid to the kernels, heating the mixture of kernels and liquid to set the starch components in the kernels, and slitting at least a portion of the kernels in the heated mixture.

3. The method of preparing corn comprising cutting substantially whole corn kernels from the cob, cleaning the kernels, adding liquid to the kernels, heating the mixture of kernels and liquid to a temperature of about 180° F., and slitting at least a portion of the kernels in the heated mixture.

4. The method of preparing corn comprising cutting substantially whole corn kernels from the cob, cleaning the kernels, adding liquid to the kernels, slitting at least a portion of the kernels in the liquid, separating a portion of the mixture from the remainder thereof, screening foreign materials from the separated portion, and remixing the separated portion with the remainder.

5. The method of preparing corn comprising cutting substantially whole corn kernels from the cob, cleaning the kernels, adding liquid to the kernels, heating the mixture of kernels and liquid to set the starch components in the kernels, slitting at least a portion of the kernels in the heated mixture, separating a portion of the mixture from the remainder, screening foreign materials from the separated portion, and remixing the separated portion with the remainder.

WILLIAM J. FITZPATRICK.

REFERENCES CITED

The following references are of record in the file of this patent:

UNITED STATES PATENTS

| Number | Name | Date |
| --- | --- | --- |
| 2,000,892 | Lewis | May 7, 1935 |
| 2,484,376 | Cover | Oct. 11, 1949 |